United States Patent
Liu et al.

(10) Patent No.: US 12,094,080 B2
(45) Date of Patent: Sep. 17, 2024

(54) SYSTEM AND METHOD FOR MAGNIFYING AN IMAGE BASED ON TRAINED NEURAL NETWORKS

(71) Applicant: Shanghai United Imaging Intelligence Co., LTD., Shanghai (CN)

(72) Inventors: Yikang Liu, Cambridge, MA (US); Shanhui Sun, Cambridge, MA (US); Terrence Chen, Cambridge, MA (US)

(73) Assignee: Shanghai United Imaging Intelligence Co., LTD., Shanghai (CN)

( * ) Notice: Subject to any disclaimer, the term of this patent is extended or adjusted under 35 U.S.C. 154(b) by 242 days.

(21) Appl. No.: 17/943,724

(22) Filed: Sep. 13, 2022

(65) Prior Publication Data
US 2024/0087082 A1   Mar. 14, 2024

(51) Int. Cl.
*G06T 3/4046* (2024.01)
*G06T 7/11* (2017.01)
*G06F 3/0482* (2013.01)

(52) U.S. Cl.
CPC .......... *G06T 3/4046* (2013.01); *G06T 7/11* (2017.01); *G06F 3/0482* (2013.01); *G06T 2200/24* (2013.01); *G06T 2207/20081* (2013.01)

(58) Field of Classification Search
CPC ..... G06T 3/4046; G06T 7/11; G06T 2200/24; G06F 2207/20081; G06F 3/0482; A61B 6/469; G06N 3/048
See application file for complete search history.

(56) References Cited

U.S. PATENT DOCUMENTS

| | | | |
|---|---|---|---|
| 11,185,294 B2 | 11/2021 | Maidment et al. | |
| 2014/0301665 A1* | 10/2014 | Saito | G06T 3/40 382/299 |
| 2019/0042860 A1* | 2/2019 | Lee | G06V 10/25 |
| 2019/0333199 A1* | 10/2019 | Ozcan | G06T 5/70 |
| 2020/0326526 A1* | 10/2020 | Yeh | G02B 21/365 |

FOREIGN PATENT DOCUMENTS

CN    107133933 A    9/2017

* cited by examiner

*Primary Examiner* — Ryan R Yang
(74) *Attorney, Agent, or Firm* — Zhong Law, LLC

(57) ABSTRACT

A magnification system for magnifying an image based on trained neural networks is disclosed. The magnification system receives a first user input associated with a selection of a region of interest (ROI) within an input image of a site and a second user input associated with a first magnification factor of the selected ROI. The first magnification factor is associated with a magnification of the ROI in the input image. The ROI is modified based on an application of a first neural network model on the ROI. The modification of the ROI corresponds to a magnified image that is predicted in accordance with the first magnification factor. A display device is controlled to display the modified ROI.

20 Claims, 6 Drawing Sheets

SYSTEM AND METHOD FOR MAGNIFYING AN IMAGE BASED ON TRAINED NEURAL NETWORKS

FIELD

The aspects of the disclosed embodiments relate generally to the field of image processing, and more specifically, to a system and method for magnifying an image based on trained neural networks.

BACKGROUND

With recent advancements in the field of medical science and medical diagnostic imaging techniques, various types of health issues that were difficult to detect in the past are now being diagnosed with more ease, precision, and accuracy. For an instance, radiology (for example, mammography) localizes suspicious lesions and informs clinical-stage and potential comorbidity detection, and pathology (for example, whole slide image (WSI)) characterizes specific histologic and molecular features of tissues. The combination of radiology and pathology may form the core of cancer diagnosis. In such medical diagnostic imaging techniques, the region of interest (ROI) at a site may be a mass (or a clot) of tissues (referred to as a tumor) or an abnormal deposition of calcium phosphates or other calcific salts (referred to as calcification). The boundary of such ROI may be a key factor for cancer diagnosis.

Usually, in such medical diagnostic imaging techniques, the ROI is substantially small as compared to the entire medical image. A physician or a technician may be required to use a viewer to manually select the ROI in the medical image and then magnify such medical image by a zooming factor (such as 2×, 4×, and the like). To magnify image (and the region of interest), traditional interpolation techniques, such as bicubic interpolation or bi-linear interpolation, may be used. However, in such images that are magnified using such interpolation techniques, the boundary of the ROI may appear blurry, which may not be acceptable, as a clear visualization of such ROI is of utmost significance in medical findings and proper diagnosis. Therefore, there is required a method that performs magnification with clear visualization of the medical image (or the ROI).

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for magnifying an image based on trained neural networks, substantially as shown in and/or described in connection with at least one of the figures, as set forth more completely in the claims.

According to a first implementation form the aspects of the disclosed embodiments are directed to a magnification system. In one embodiment, the magnification system includes a hardware processor. The hardware processor is configured to receive a first user input associated with a selection of a region of interest (ROI) within an input image of a site and receive a second user input associated with a first magnification factor of the selected ROI. The first magnification factor is associated with a magnification of the ROI in the input image. The hardware processor is also configured to modify the ROI based on an application of a first neural network model on the ROI. The modification of the ROI corresponds to a magnified image that is predicted in accordance with the first magnification factor. The hardware processor is also configured to control a display device to display the modified ROI.

In a possible implementation form, the aspects of the disclosed embodiments are directed to a computer implemented method. In one embodiment, the method includes receiving, by a hardware processor, a first user input associated with a selection of a region of interest (ROI) within an input image of a site and receiving, by the hardware processor, a second user input associated with a first magnification factor of the selected ROI. The first magnification factor is associated with a magnification of the ROI in the input image. The method also includes modifying, by the hardware processor, the ROI based on an application of a first neural network model on the ROI, wherein the ROI is magnified in accordance with the first magnification factor and controlling, by the hardware processor, a display device to display the modified ROI.

These and other advantages, aspects, and novel features of the present disclosure, as well as details of an illustrated embodiment thereof, will be more fully understood from the following description and drawings.

DETAILED DESCRIPTION OF THE DISCLOSED EMBODIMENTS

The aspects of the disclosed embodiments are generally directed to a method and system for magnifying an image based on trained neural networks. The various aspects of the disclosed embodiments provide a method and system that may correspond to a solution that utilizes a set of neural network models, each of which may be trained to magnify the image, in accordance with a specific magnification factor. Conventional image viewers may be based on conventional interpolation algorithms, where the user is required to magnify the region of interest (ROI) for several times folding to properly visualize the ROI. However, such interpolation of an image or the ROI introduces blurriness in the image each time the ROI is magnified. In contrast, the magnification system of the disclosed embodiments provides an improved workflow for a viewer using an artificial intelligence (AI)-based zoom-in algorithm which provide a clear visualization even after multifold magnification of the image or the ROI. The disclosed magnification system, or an AI image viewer, in a super-resolution network can utilize an unsupervised learning method to intelligently generate a higher resolution image or image patch (or ROI) for a substantially clear visualization.

Figure 1:
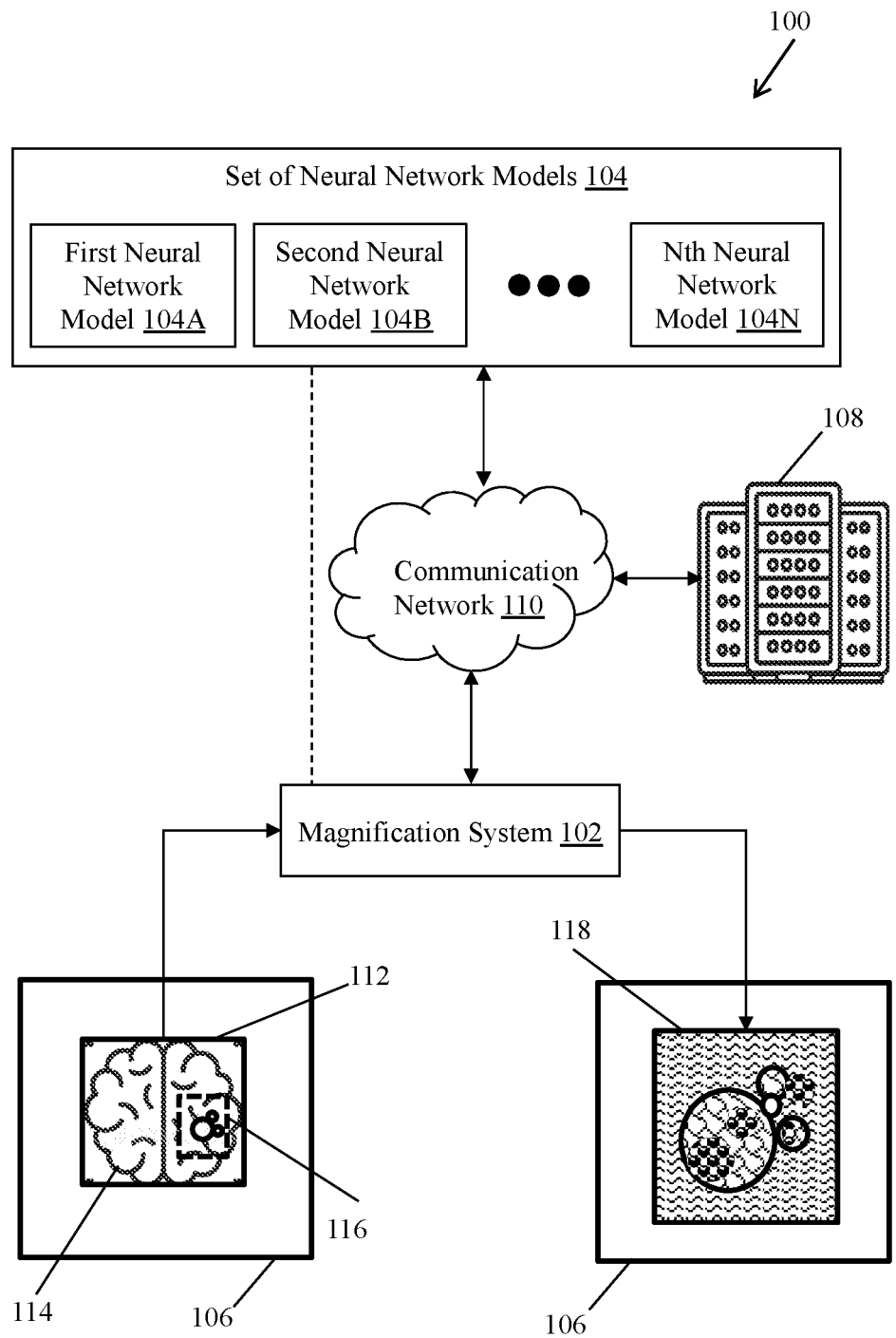
FIG. 1 is a block diagram that illustrates an exemplary environment for magnifying an image based on trained neural networks, in accordance with an exemplary embodiment of the disclosure.

FIG. 1 is a block diagram that illustrates an exemplary environment for magnifying an image based on trained neural networks, in accordance with an exemplary embodiment of the disclosure. Referring to FIG. 1, there is shown a network environment 100, which may include a magnification system 102, a set of neural network models 104, a display device 106, a server 108, and a communication network 110. The set of neural network models 104 may include a first neural network model 104A, a second neural network model 104B, up to an Nth neural network model 104N. There is further shown an input image 112 of a site 114, a region of interest (ROI) 116 within the input image 112, and a modified ROI 118. In an embodiment, the display device 106 may be integrated within the magnification system 102.

Figure 2:
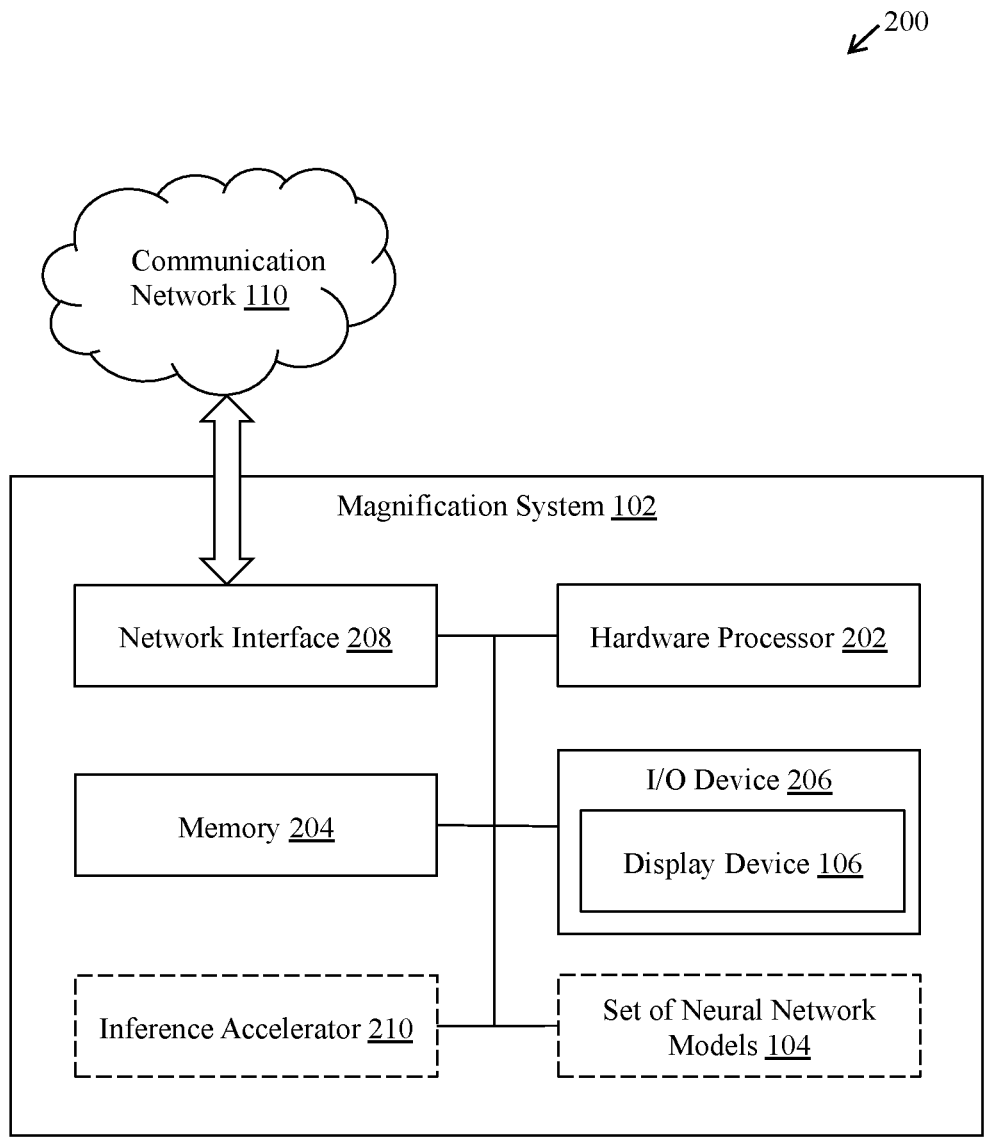
FIG. 2 is a block diagram that illustrates an exemplary magnification system for magnifying an image based on trained neural networks, in accordance with an embodiment of the disclosure.

Referring also to FIG. 2, the magnification system 102 includes a hardware processor 202. The hardware processor 202 is configured to receive a first user input associated with a selection of a region of interest (ROI) within an input image of a site and receive a second user input associated with a first magnification factor of the selected ROI. The first magnification factor is associated with a magnification of the ROI in the input image. The hardware processor 202 is also configured to modify the ROI based on an application of a first neural network model on the ROI. The modification of the ROI corresponds to a magnified image that is predicted in accordance with the first magnification factor. The hardware processor 202 is also configured to control a display device 106 to display the modified ROI.

The magnification system 102 may comprise suitable logic, circuitry, interfaces, and/or code that may be configured to magnify the ROI 116 within the input image 112. In some embodiments, the magnification system 102 may be further configured to apply the first neural network model 104A from the set of neural network models 104 on the ROI 116 to magnify the ROI 116. The magnification system 102 may be further configured to control the display device 106 to display the modified ROI 118. Examples of the magnification system 102 may include, but are not limited to, a computing device, a mainframe machine, a server, a computer workstation, a smartphone, a cellular phone, a mobile phone, a gaming device, and/or a consumer electronic (CE) device with image processing capabilities.

Each of the set of neural network models 104 may be a computational network or a system of artificial neurons, arranged in a plurality of layers, as nodes. The plurality of layers of each of the set of neural network models 104 may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the corresponding neural network model. Outputs of each hidden layer may be coupled to inputs of at least one node in other layers of the corresponding neural network model. Node(s) in the final layer may receive inputs from at least one hidden layer to output a result. The number of layers and the number of nodes in each layer may be determined from hyper-parameters of the corresponding neural network model. Such hyper-parameters may be set before or while training the corresponding neural network model on a training dataset.

Each of the set of neural network models 104 may correspond to a mathematical function (for example, a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (for example, previous layer(s)) of the corresponding neural network model. All or some of the nodes of the each of the set of neural network models 104 may correspond to the same or different mathematical function.

In training of each of the set of neural network models 104, one or more parameters of each node of the corresponding neural network model may be updated based on whether an output of the final layer for a given input (from the training dataset) matches a correct result based on a loss function for the corresponding neural network model. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

Each of the set of neural network models 104 may include electronic data, such as a software program, code of the software program, libraries, applications, scripts, or other logic or instructions for execution by a processing device, such as hardware processor. Each of the set of neural network models 104 may include code and routines configured to enable a computing device, such as the magnification system 102, to perform one or more operations. Additionally or alternatively, each of the set of neural network models 104 may be implemented using hardware including a processor, a microprocessor, a field-programmable gate array (FPGA), or an application-specific integrated circuit (ASIC) to perform or control performance of one or more operations. Alternatively, in some embodiments, each of the set of neural network models 104 may be implemented using a combination of hardware and software. Although in FIG. 1, the set of neural network models 104 is shown as a separate entity from the magnification system 102, the disclosure is not so limited. Accordingly, in some embodiments, the set of neural network models 104 may be integrated within the magnification system 102, without deviation from scope of the disclosure. In an embodiment, the set of neural network models 104 may be stored in the server 108. Examples of the each of the set of neural network models 104 may include, but are not limited to, a deep neural network (DNN), a convolutional neural network (CNN), a CNN-recurrent neural network (CNN-RNN), R-CNN, Fast R-CNN, Faster R-CNN, an artificial neural network (ANN), (You Only Look Once) YOLO network, a fully connected neural network, and/or a combination of such networks.

The display device 106 may comprise suitable logic, circuitry, and interfaces that may be configured to display the modified ROI 118. In accordance with an embodiment, the display device 106 may be a touch screen which may enable the user to provide user inputs (such as a first user input, a second user input, and a third user input) via the display device 106. The touch screen may be at least one of a resistive touch screen, a capacitive touch screen, or a thermal touch screen. The display device 106 may be realized through several known technologies. Examples of such technologies may include, but are not limited to, at least one of a Liquid Crystal Display (LCD) display, a Light Emitting Diode (LED) display, a plasma display, or an Organic LED (OLED) display technology, or other display devices.

The server 108 may include suitable logic, circuitry, and interfaces, and/or code that may be configured to store the input image 112 of the site 114. The server 108 may be further configured to store one or more user inputs. In some embodiments, the server 108 may be further configured to store the set of neural network models 104. In some embodiments, the server 108 may be configured to train each of the set of neural network models 104. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the magnification system 102 as two separate entities. In certain embodiments, the functionalities of the server 108 can be incorporated in its entirety or at least partially in the magnification system 102, without a departure from the scope of the disclosure.

The communication network 110 may include a communication medium through which the magnification system 102, the display device 106, and the server 108 may communicate with each other. The communication network 110 may be one of a wired connection or a wireless connection. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the magnification system 102 may be configured to receive a first user input via the display device 106. The first user input may be associated with a selection of the ROI 116 within the input image 112 of the site 114. The selection of the ROI 116 may correspond to a selection of a specific area in the input image 112 of the site 114. In an exemplary embodiment, the input image 112 may correspond to a medical image and may be an MRI of brain of a patient. It should be noted that the aforesaid example of the input image 112 should not be construed to be limiting and other examples of the first image corresponding to other body parts of the patient may be possible, without deviation from the scope of the disclosure. In an exemplary embodiment, the site 114 may correspond to a tumor in the input image 112. The tumor may be visible as a white dot in the input image 112. The ROI 116 in the input image 112 may correspond to a defined area around the tumor.

Once the ROI 116 is selected based on the first user input, the magnification system 102 may be configured to receive a second user input via the display device 106. The second user input may be associated with a first magnification factor of the selected ROI 116. The first magnification factor may correspond to a factor by which the ROI 116 within the input image 112 may be magnified (or enlarged). Thus, the first magnification factor may be associated with a magnification of the ROI 116. The magnification of the selected ROI 116 may correspond to a magnified image that may be predicted in accordance with the first magnification factor so that details in the selected ROI 116 become more visible and clearer.

The magnification system 102 may be further configured to select the first neural network model 104A from the set of neural network models 104 based on the second user input. The first neural network model 104A may be associated with the first magnification factor. Specifically, the first neural network model 104A may be trained to magnify the ROI 116 in accordance with the first magnification factor. Details about the training of each of the set of neural network models 104 is provided based on a training of an exemplary neural network model, for example, in FIGS. 3B and 4.

The magnification system 102 may be further configured to apply the selected first neural network model 104A on the ROI 116. The magnification system 102 may be further configured to modify the ROI 116 based on an application of the selected first neural network model 104A on the ROI 116. As discussed above, the modification of the ROI 116 may correspond to a magnified image that may be predicted in accordance with the first magnification factor. The magnification system 102 may be configured to control the display device 106 to display the modified ROI 118. Details about the modified ROI 118 are provided, for example, in FIG. 3A.

FIG. 2 is a block diagram that illustrates an exemplary magnification system for magnifying an image based on trained neural networks, in accordance with an embodiment of the disclosure. FIG. 2 is explained in conjunction with elements from FIG. 1. With reference to FIG. 2, there is shown a block diagram 200 of the magnification system 102. The magnification system 102 may include a hardware processor 202, a memory 204, an input/output (I/O) device 206, a network interface 208, an inference accelerator 210, and the set of neural network models 104. The hardware processor 202 may be communicatively coupled to the memory 204, the I/O device 206, the network interface 208, the inference accelerator 210, and the set of neural network models 104. The I/O device 206 may further include the display device 106.

The hardware processor 202 may include suitable logic, circuitry, and interfaces that may be configured to execute program instructions associated with different operations to be executed by the magnification system 102. For example, some of the operations may include, but are not limited to, receiving the first user input, receiving the second user input, modifying the ROI 116, and controlling the display device 106 to display the modified ROI 118. The hardware processor 202 may include one or more specialized processing units, which may be implemented as an integrated processor or a cluster of processors that perform the functions of the one or more specialized processing units, collectively. The hardware processor 202 may be implemented based on a number of processor technologies known in the art. Examples of implementations of the hardware processor 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the hardware processor 202. In at least one embodiment, the memory 204 may store various images, such as the input image 112, a first image, a second image, a third image, a fourth image, and a fifth image. The memory 204 may also store the set of neural network models 104. In an embodiment, the memory 204 may be further configured to store a first loss function and a second loss function. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive one or more user inputs and provide an output. For example, the magnification system 102 may receive the first user input, the second user input, and the third user input, via the I/O device 206. The I/O device 206 may further display the modified ROI 118. The I/O device 206 which includes various input and output devices, may be configured to communicate with the hardware processor 202. Examples of the I/O device 206 may include, but are not limited to, a touch screen, a keyboard, a mouse, a joystick, a microphone, a display device (such as the display device 106), and a speaker.

The network interface 208 may include suitable logic, circuitry, and interfaces that may be configured to facilitate a communication between the hardware processor 202, the set of neural network models 104, the display device 106, and the server 108, via the communication network 110. The network interface 208 may be implemented by use of various known technologies to support wired or wireless communication of the magnification system 102 with the communication network 110. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The inference accelerator 210 may include suitable logic, circuitry, interfaces, and/or code that may be configured to operate as a co-processor for the hardware processor 202 to accelerate computations associated with the operations of the each of the set of neural network models 104 for the magnification task. An example of an accelerated computation may be generation of the modified ROI 118 in less time than what is typically incurred without the use of the inference accelerator 210. The inference accelerator 210 may implement various acceleration techniques, such as parallelization of some or all of the operations of the corresponding neural network model. The inference accelerator 210 may be implemented as a software, a hardware, or a combination thereof. Example implementations of the inference accelerator 210 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

The functions or operations executed by the magnification system 102, as described in FIG. 2, may be performed by the hardware processor 202. Various operations executed by the hardware processor 202 are described in detail, for example, in FIGS. 3A, 3B, 4, and 5.

Figure 3A:
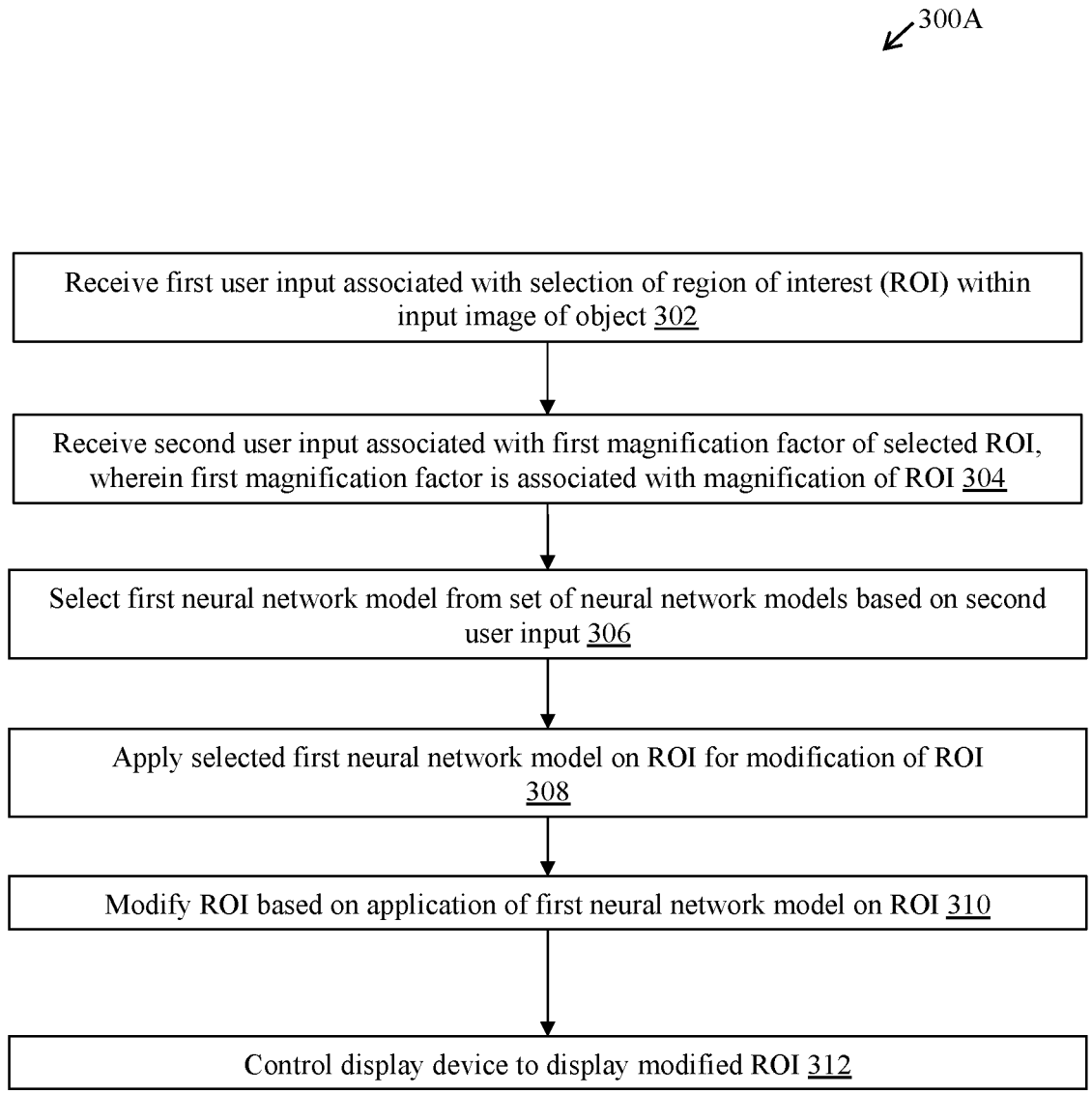
FIG. 3A is a flowchart that illustrates exemplary operations for magnifying an image based on trained neural networks, in accordance with an embodiment of the disclosure.

FIG. 3A is a flowchart that illustrates exemplary operations for magnifying an image based on trained neural networks, in accordance with an embodiment of the disclosure. FIG. 3A is explained in conjunction with elements from FIG. 1 and FIG. 2. With reference to FIG. 3A, there is shown a flowchart 300A that illustrates exemplary operations from 302 to 312, as described herein. The exemplary operations illustrated in the flowchart 300A may start at 302 and may be performed by any computing system, apparatus, or device, such as the hardware processor 202, the memory 204, the I/O device 206, the network interface 208, the inference accelerator 210, and the set of neural network models 104 of the magnification system 102, as described in FIG. 2. Although illustrated with discrete blocks, the exemplary operations associated with one or more blocks of the flowchart 300A may be divided into additional blocks, combined into fewer blocks, or eliminated, depending on the particular implementation.

At 302, a first user input may be received. In an embodiment, the hardware processor 202, in conjunction with the I/O device 206 and the network interface 208 of the magnification system 102, may be configured to receive the first user input from a user of the magnification system 102. The user may be, for example, a technician or a physician in a medical environment.

The first user input may be received for the input image 112 of the site 114. In an embodiment, the input image 112 may correspond to a medical image generated when a medical scan, such as radiology, pathology, or the like, is performed on a specific infected body part, referred to as the site 114. In an exemplary embodiment, the input image 112 may be generated when an MRI scan is performed on a patient for detection of brain cancer in the patient. The input image 112 may be loaded by the user into a view on the display device 106.

Once the input image 112 is loaded by the user into the view, the user may provide a first user input by use of an input device from the I/O device 206. By way of one example, the first user input may be provided by the user by moving the mouse to the target, i.e., the ROI 116. By way of another example, the first user input may be provided by the user by manipulating a first user interface (UI) element rendered on a display screen of the display device 106.

The ROI 116 may correspond to an area in the input image 112 that may be of interest to the user. For example, if the input image 112 is a medical image of the brain of the patient generated by an MRI scan, then the ROI 116 may correspond to an area around a tumor (usually visible as a white dot) in the medical image. In such manner, the ROI 116 may be selected within the input image 112 of the site 114.

At 304, a second user input may be received. In an embodiment, the hardware processor 202, in conjunction with the I/O device 206 and the network interface 208 of the magnification system 102, may be configured to receive the second user input from the user. The second user input may be associated with a magnification factor of the selected ROI 116. The magnification factor may be associated with a degree of magnification required for the ROI 116. Specifically, the magnification factor may correspond to a factor by which the ROI 116 may be magnified, enlarged, or zoomed in. As an example, the magnification factor may be one of 2×, 4×, 8×, 10×, and so on.

In accordance with an embodiment, the hardware processor 202 may be configured to control the display device 106 to render a user interface (UI) element on a display screen of the display device 106. The second user input associated with the first magnification factor may be received via the rendered UI element.

By way of one example, the second user input may be provided by the user by using a physical or virtual keypad from the I/O device 206. By way of another example, the second user input may be provided by the user by manipulating the UI element rendered on a display screen of the display device 106. Examples of the UI element may include a magnify ruler, an icon designated to initiate a magnifier, or the like. In such an embodiment, the user may be able to change the magnification factor, based on which the ROI 116 may be modified in real-time in accordance with the value of the updated magnification factor.

At 306, a first neural network model may be selected. In an embodiment, the hardware processor 202, in conjunction with the memory 204 of the magnification system 102 and the server 108, may be configured to select the first neural network model 104A from the set of neural network models 104 based on the second user input. Specifically, the hardware processor 202 of the magnification system 102 may be configured to select the first neural network model 104A based on a value of the first magnification factor included in the received second user input.

In an embodiment, each neural network from the set of neural network models 104 may be trained to magnify the ROI 116 or the input image 112 in entirety in accordance with the magnification factor. By way of one example, the first neural network model 104A from the set of neural network models 104 may be trained to magnify the ROI 116 in accordance with the first magnification factor. By way of another example, the second neural network model 104B from the set of neural network models 104 may be trained to magnify the ROI 116 in accordance with a second magnification factor. Similarly, the Nth neural network model 104N from the set of neural network models 104 may be trained to magnify the ROI 116 in accordance with an Nth magnification factor. To summarize, the magnified ROI 116 may be predicted in accordance with the magnification factor based on which the corresponding neural network model is trained. Details about training each of the set of neural network models 104 are provided, for example, in FIGS. 3B and 4.

At 308, the selected first neural network model 104A may be applied on the ROI 116. In an embodiment, the hardware processor 202, in conjunction with the memory 204, the inference accelerator 210 of the magnification system 102 and the server 108, may be configured to apply the selected first neural network model 104A on the ROI 116. The selected first neural network model 104A may be applied on the ROI 116 to modify the ROI 116. The modified ROI 118 may correspond to a magnified image that is predicted in accordance with the first magnification factor.

At 310, the ROI 116 may be modified. In an embodiment, the hardware processor 202, in conjunction with the selected first neural network model 104A, may be configured to modify the ROI 116. The modification of the ROI 116 corresponds to a magnified image that is predicted in accordance with the first magnification factor. In other words, the modified ROI 118 may correspond to a magnified image that is predicted in accordance with the first magnification factor. The modified ROI 118 may provide additional and clearer details in comparison to the ROI 116 visualized in the input image 112.

As an example, if the ROI 116 is around the tumor in the medical image of the brain of the patient, then a boundary of the tumor is a key factor in determination of the cancer or a type of cancer. The modified ROI 118 may provide additional and clearer details within the boundary of the tumor as compared to the ROI 116 visualized in the input image 112.

At 312, the display device may be controlled to display the modified ROI 118. In an embodiment, the hardware processor 202, in conjunction with the memory 204 and the display device 106, may be configured to control the display device 106 to display the modified ROI 118. Specifically, the modified ROI 118 may be displayed on the user interface rendered on the display device 106.

In an embodiment, the magnification system 102 may be configured to receive a third user input from the user, in a manner similar to the second user input, as described above. The received third user input may be associated with a second magnification factor different from the magnification factor. Based on the reception of the third user input, the magnification system 102 may be configured to select the second neural network model 104B from the set of neural network models 104. The magnification system 102 may further apply the selected second neural network model 104B model on the ROI 116. The magnification system 102 may further modify the ROI 116 based on the application of the second neural network model 104B on the ROI 116. The ROI 116 may be magnified in accordance with the second magnification factor.

As an example, at time T1, the first magnification factor may be '2×', then the magnification system 102 may be configured to select the first neural network model 104A. The magnification system 102 may be further configured to modify the ROI 116 based on the application of the first neural network model 104A on the ROI 116. The magnification system 102 may further control the display device 106 to display the modified ROI 118. At time T2, the magnification system 102 may receive the third user input associated with the second magnification factor of '3×'. Based on the reception of the third user input, the magnification system 102 may be configured to select the second neural network model 104B and modify the ROI 116 based on the application of the second neural network model 104B on the ROI 116. The magnification system 102 may further control the display device 106 to display the modified ROI 118. Therefore, the disclosed magnification system 102 may be capable of seamlessly selecting different neural network models based on the received user inputs and modify the ROI 116 accordingly. The visualization provided to the user may be a smooth transit from one modification of the ROI 116 to another one.

In an embodiment, the value of the magnification factor may be a fractional value or a decimal value and may contain a natural number and a fractional part. For example, the value of the magnification factor may be 'x·y'. The natural number in such value is indicated as 'x' and the fractional part is indicated as 'y'. In such an embodiment, the magnification system 102 may be configured to apply a nearest integer function on the value of the magnification factor based on a determination of the fractional part in the value of the magnification factor. The nearest integer function may round up the value to the nearest integer less than or equal to the given value. The magnification system 102 may be configured to calculate a new value of the magnification factor based on the application of the nearest integer function. As discussed above, the calculated new value may be equal to the nearest integer less than or equal to the given number. For example, if the value is '3.8', then the calculated new value may be '4' and if the value is '3.3', then the calculated new value may be '3'. In such an embodiment, the magnification system 102 may be configured to select the third neural network model from the set of neural network models 104 based on the calculated new value. It should be noted that the visualization of the modified ROI 118 has a smooth transit in accordance with one magnification factor to another magnification factor.

In accordance with an embodiment, the magnification system 102 may display real-time and magnified result when the user moves a mouse over the ROI 116 displayed on the display device 106. In accordance with another embodiment, the magnification system 102 may update the result on the display device 106 in real-time when the mouse pointer is placed within or on the boundary of the ROI 116 and an event, such as scrolling the mid-button of the mouse, may trigger the update of the modified ROI 118.

Figure 3B:
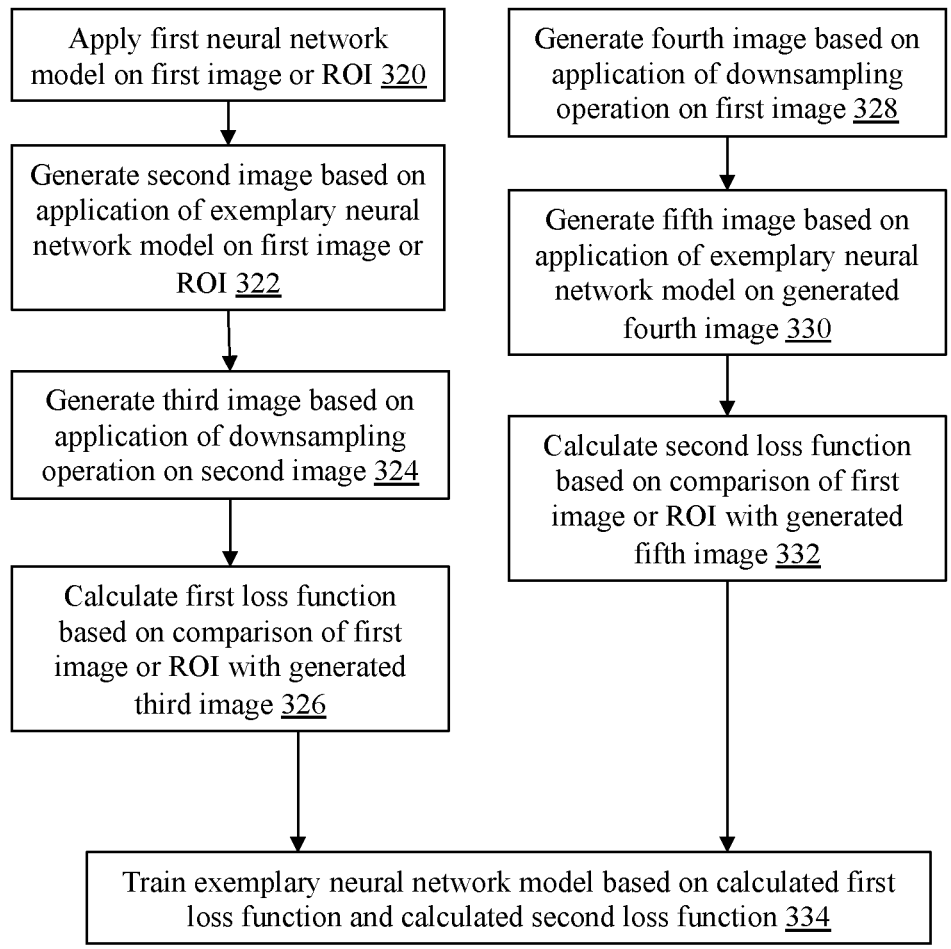
FIG. 3B is a flowchart that illustrates training of a neural network model from the set of neural network models for magnifying an image, in accordance with an embodiment of the disclosure.

FIG. 3B is a flowchart that illustrates training of a neural network model from the set of neural network models for magnifying an image, in accordance with an embodiment of the disclosure. FIG. 3B is explained in conjunction with elements from FIGS. 1, 2, 3A, and 4. With reference to FIG. 3B, there is shown a flowchart 300B that illustrates exemplary operations from 320 to 334, as described herein. The exemplary operations illustrated in the flowchart 300B may start at 320 and may be performed by each of the set of neural network models 104, such as an exemplary neural network model 402 (depicted in FIG. 4), in conjunction with the hardware processor 202, the memory 204, the I/O device 206, the network interface 208, and the inference accelerator 210, as described in FIG. 2. Although illustrated with discrete blocks, the exemplary operations associated with one or more blocks of the flowchart 300B may be divided into additional blocks, combined into fewer blocks, or eliminated, depending on the particular implementation.

At 320, the exemplary neural network model 402 may be applied on a first image 404 (depicted in FIG. 4), or an ROI of the first image 404. In accordance with an embodiment, the hardware processor 202 may be configured to apply the exemplary neural network model 402 on the first image 404 or the ROI. As discussed above, the first image 404 may correspond to the medical image, such as the input image 112.

At 322, a second image 406 (depicted in FIG. 4) may be generated based on the application of the exemplary neural network model 402 on the first image or the ROI. In accordance with an embodiment, the exemplary neural network model 402 may be configured to be applied on the first image 404 or the ROI to generate the second image 406. Specifically, the first image 404 may be modified in accordance with the first magnification factor based on the application of the exemplary neural network model 402. The second image 406 may correspond to a modification of the first image 404.

At 324, a third image 408 (depicted in FIG. 4) may be generated based on an application of a downsampling operation on the second image 406. In accordance with an embodiment, the hardware processor 202 may be configured to generate the third image 408 based on an application of a downsampling operation on the second image 406. The second image 406 may be downsampled in accordance with a resizing factor that may be associated with the first magnification factor. In an embodiment, the resizing factor may be a reciprocal of the first magnification factor.

At 326, a first loss function may be calculated based on a comparison of the first image 404 or the ROI with the generated third image 408. In accordance with an embodiment, the hardware processor 202 may be configured to calculate the first loss function based on a comparison of the first image 404 or the ROI with the generated third image 408. In an embodiment, the calculated first loss function may correspond to, but is not limited to, a pixel-wise loss function, or a perceptual loss function.

In a parallel flow, at 328, a fourth image 410 (depicted in FIG. 4) may be generated based on the application of the downsampling operation on the first image 404 or the ROI. In accordance with an embodiment, the hardware processor 202 may be configured to generate the fourth image 410 based on the application of the downsampling operation on the first image 404 or the ROI. Similar to the generation of the third image 408, the hardware processor 202 may be configured to apply the downsampling operation on the first image 112 to generate the fourth image 410. The first image 112 may be downsampled in accordance with the resizing factor that may be associated with the first magnification factor. In an embodiment, the resizing factor may be the reciprocal of the first magnification factor.

At 330, a fifth image 412 (depicted in FIG. 4) may be generated based on the application of the exemplary neural network model 402 on the generated fourth image 410. In accordance with an embodiment, the exemplary neural network model 402 may be configured to be applied on the fourth image 410 to generate the fifth image 412.

At 332, a second loss function may be calculated based on the comparison of the first image 404 or the ROI with the generated fifth image 412. In accordance with an embodiment, the hardware processor 202 may be configured to calculate the second loss function based on the comparison of the first image 404 or the ROI with the generated fifth image 412. In an embodiment, the calculated second loss function may correspond to, but is not limited to, the pixel-wise loss function, or the perceptual loss function.

At 334, the exemplary neural network model 402 may be trained based on the calculated first loss function and the calculated second loss function. Thus, the exemplary neural network model 402 may be trained based on the first image 404 or the ROI, the third image 408, and the fifth image 412. In accordance with an embodiment, the hardware processor 202 may be configured to train the exemplary neural network model 402 based on the calculated first loss function and the calculated second loss function.

Figure 4:
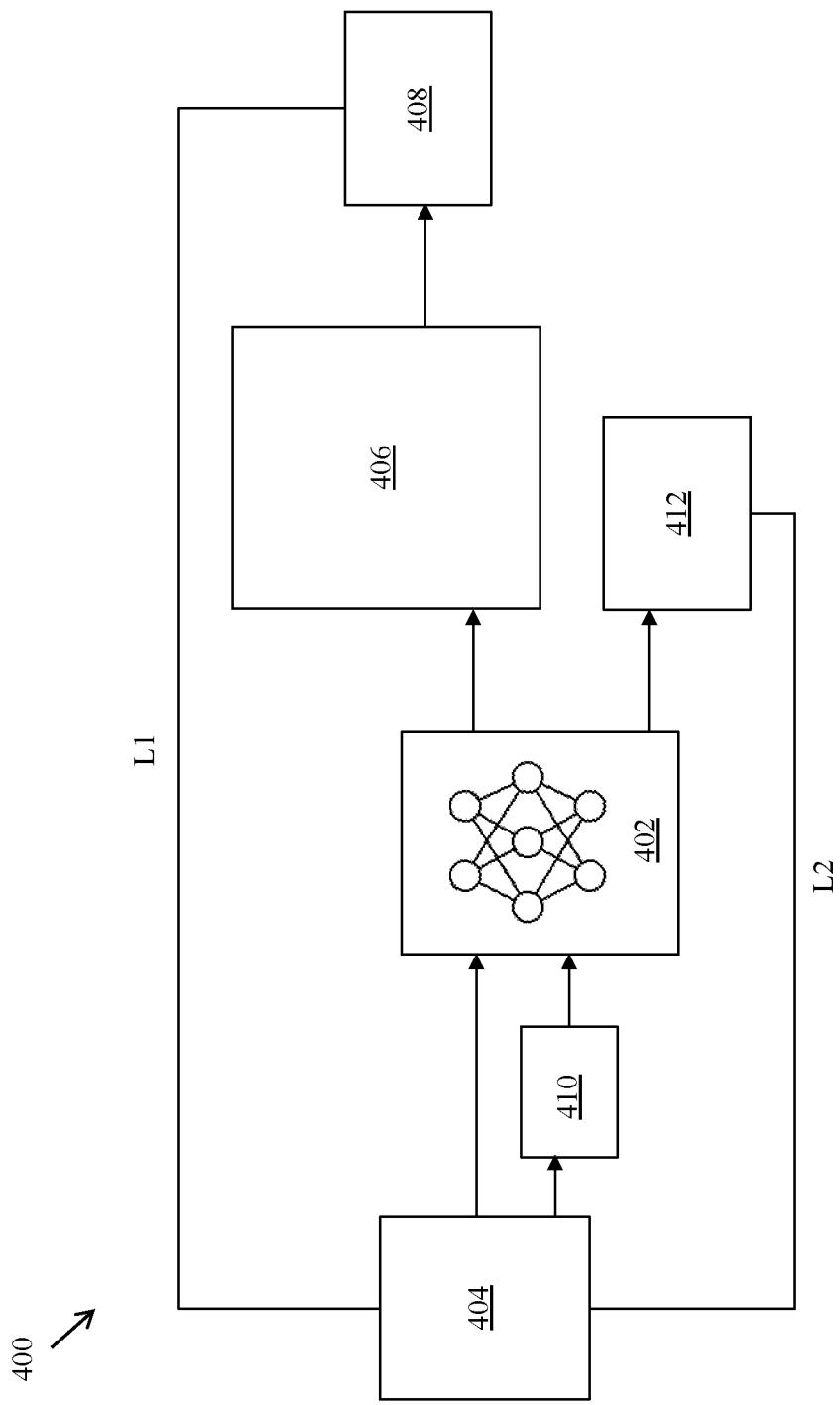
FIG. 4 is a diagram that illustrates training of a neural network model for magnifying an image, in accordance with an embodiment of the disclosure.

FIG. 4 is an exemplary diagram that illustrates training of a neural network model from the set of neural network models for magnifying an image, in accordance with an embodiment of the disclosure. FIG. 4 is explained in conjunction with elements from FIGS. 1, 2, 3A, and 3B. With reference to FIG. 4, there is shown an exemplary diagram 400 that includes the exemplary neural network model 402. It should be understood that the workflow of the exemplary diagram 400 may be applied to train the exemplary neural network model 402 that corresponds to each neural network model from the set of neural network models 104.

There is further shown the first image 404, the second image 406, the third image 408, the fourth image 410, and the fifth image 412. The workflow indicated in the exemplary diagram 400 corresponds to an unsupervised learning-based approach that may be used to train the exemplary neural network model 402.

In an exemplary embodiment illustrated in the exemplary diagram 400 of FIG. 4, the exemplary neural network model 402 may be configured to receive a medical image, such as the first image 404 of a body part of a patient. In accordance with different embodiments, the first image 404, which is a low resolution (LR) image, may correspond to the ROI 116 or the medical image in entirety. The medical image may be generated using a magnetic resonance imaging (MRI) technique that is based on a magnetic field and computer-generated radio waves to create detailed images of the organs and tissues in a body part, which is the knee portion of the patient in the above embodiment. It should be noted that the above example used herein is for the purpose of describing a particular embodiment only and is not intended to be limiting of embodiments of the disclosure.

The exemplary neural network model 402 may be configured to be applied on the first image 404 or a specific region, such as the ROI 116, of the first image 404. Based on the application of the exemplary neural network model 402 on the first image 404 or the specific region within the first image 404, the exemplary neural network model 402 may be configured to generate the second image 406. The second image 406 may correspond to a high resolution (HR) image with a magnification factor 'N'. In other words, the first image 404 or the specific region within the first image 404 may correspond to a magnified image that is predicted in accordance with the first magnification factor, i.e., the magnification factor 'N'.

In accordance with an embodiment, the third image 408 based may be generated based on an application of a downsampling operation on the second image 406. Thus, the second image 406 may be downsampled to the third image 408 which may correspond to an LR image. The third image 408 may be generated by downsampling the second image 406 by a resizing factor, such as '1/N', associated with the first magnification factor, i.e., the magnification factor 'N'. The downsampling operation may reduce the size of the second image 406 based on the resizing factor to obtain the third image 408. Thus, the third image 408 may include lesser pixels as compared to a number of pixels in the second image 406. As indicated, the resizing factor may be reciprocal of the first magnification factor. Thus, the modification of the first image 404 to the third image 408 using the exemplary neural network model 402 may correspond to an unsupervised learning with no HR ground truth as high-resolution ground truth images for generating ground truth images do not exist.

In an embodiment, the exemplary neural network model 402 may be configured to apply the downsampling operation on the first image 404 or the specific region within the first image 404 to generate the fourth image 410. In accordance with an embodiment, the fourth image 410 may be generated by downsampling the first image 404 or the specific region within the first image 404 by the resizing factor. The fourth image 410 may correspond to an LR image with a resizing factor '1/N'. Based on the application of the downsampling operation on the first image 404 or the specific region within the first image 404, the exemplary neural network model 402 may generate the fourth image 410.

The fourth image 410 thus generated may include lesser pixels as compared to the number of pixels in the second image 406. As described above in the context of the third image 408, the downsampling operation applied on the first image 404 or the specific region within the first image 404 may reduce the size of the first image 404 or the specific region within the first image 404 based on the resizing factor to obtain the fourth image 410. Thus, the fourth image 410 may include lesser pixels as compared to the number of pixels in the first image 404 or the specific region within the first image 404.

The fourth image 410 may be thereafter provided to the exemplary neural network model 402. Based on the received fourth image 410, the exemplary neural network model 402 may be configured to generate the fifth image 412, whose size may be same as the size of the first image 404. The fifth image 412 may correspond to an LR image with a magnification factor 'N'. In other words, the fifth image 412 may be magnified in accordance with the first magnification factor, i.e., the magnification factor 'N'. Thus, the modification of the first image 404 to the fifth image 412 using the exemplary neural network model 402 may correspond to a self-supervised learning.

To train the exemplary neural network model 402, a suitable logic, circuitry, interfaces, and/or code, for example, the hardware processor 202 in conjunction with at least the memory 204, the inference accelerator 210, and/or the server 108, may be configured to calculate loss functions, such as a first loss function (L1) and a second loss function (L2) of the exemplary neural network model 402. More specifically, the suitable logic, circuitry, interfaces, and/or code may calculate the first loss function (L1) based on a comparison of the first image 404 with the generated third image 408, and the second loss function (L2) based on a comparison of the first image 404 with the generated fifth image 412. In an embodiment, the calculated first loss function (L1) and the second loss function (L2) may correspond to, but is not limited to, a pixel-wise loss function, or a perceptual loss function.

Based on the calculated loss functions, i.e., first loss function (L1) and the second loss function (L2), the exemplary neural network model 402 may be trained and thereafter may be used to realize the magnification system 102. In other words, the trained exemplary neural network model 402 may be used in real-time scenarios for magnification of any image (or ROI) by the magnification factor 'N'. In a similar manner, other similar instances of the exemplary neural network model 402 may be trained for different magnification factors, such as 2×, 3×, 4× . . . , N×. Once trained, all such instances of the exemplary neural network model 402 may be stored in the memory 204. When the magnification factor is set based on the second user input at an exemplary magnifier realized by the magnification system 102, a neural network model for corresponding magnification factor may be selected. Accordingly, the corresponding magnified image may be predicted by the magnification system 102.

Figure 5:
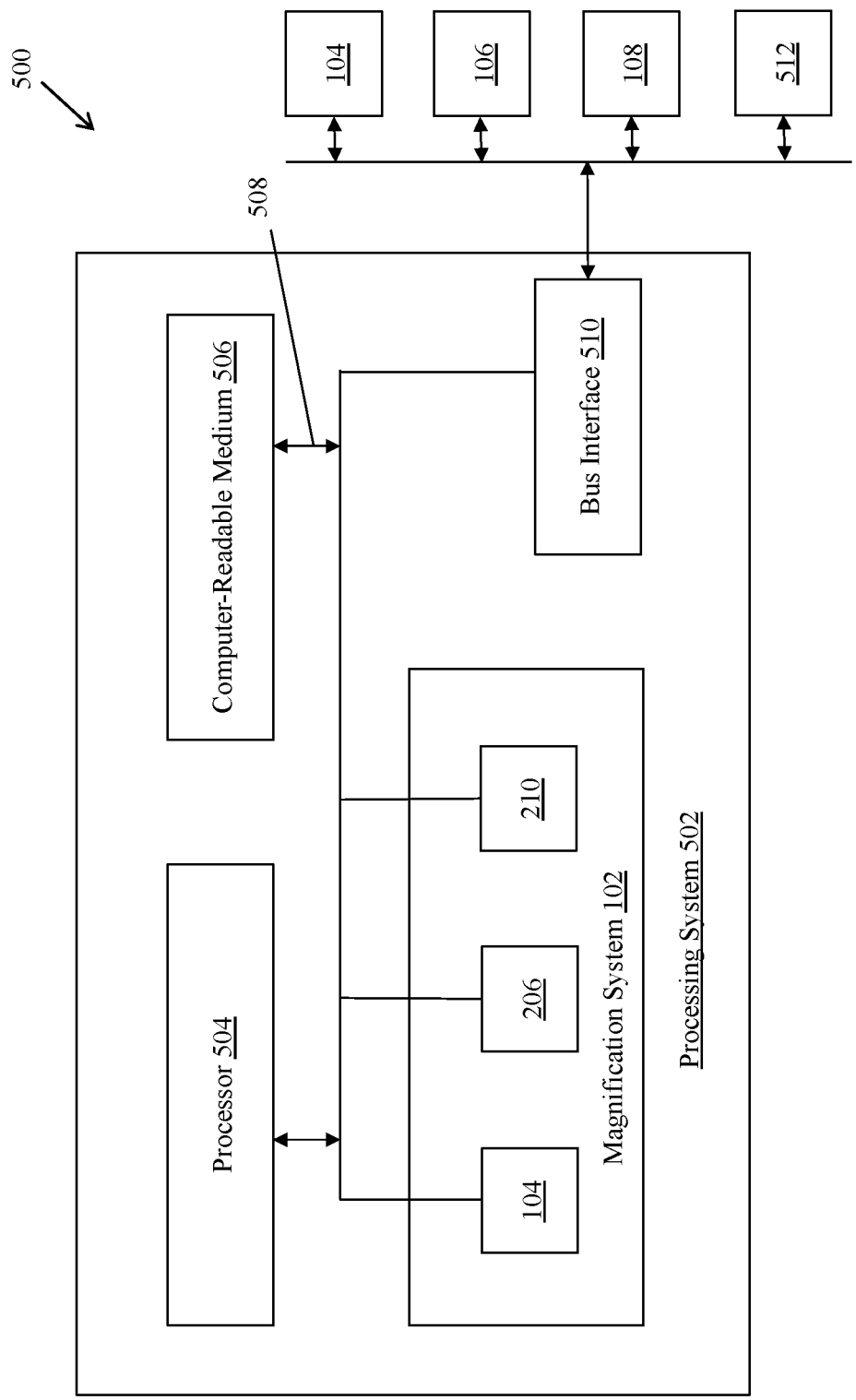
FIG. 5 is a schematic block diagram illustrating an example of a hardware implementation for a magnification system used for magnifying an image based on trained neural networks, in accordance with an exemplary embodiment of the disclosure.

FIG. 5 is a conceptual diagram illustrating an example of a hardware implementation for a magnification system used for magnifying an image based on trained neural networks, in accordance with an exemplary embodiment of the disclosure. Referring to FIG. 5, the hardware implementation shown by a representation 500 for the network environment 100 employs a processing system 502 for magnifying an image based on trained neural networks, in accordance with an exemplary embodiment of the disclosure, as described herein.

In some examples, the processing system 502 may comprise a processor 504, a non-transitory computer-readable medium 506, a bus 508, a bus interface 510, and a transceiver 512.

The processor 504, such as the hardware processor 202, may be configured to manage the bus 508 and general processing, including the execution of a set of instructions stored on the non-transitory computer-readable medium 506. The set of instructions, when executed by the processor 504, causes the magnification system 102 to execute the various functions described herein for any particular apparatus. The processor 504 may be implemented, based on a number of processor technologies known in the art. Examples of the processor 504 may be RISC processor, ASIC processor, CISC processor, and/or other processors or control circuits.

The non-transitory computer-readable medium 506 may be used for storing data that is manipulated by the processor 504 when executing the set of instructions. The data is stored for short periods or in the presence of power.

The bus 508 may be configured to link together various circuits. In this example, the network environment 100 employing the processing system 502 and the non-transitory computer-readable medium 506 may be implemented with bus architecture, represented generally by bus 508. The bus 508 may include any number of interconnecting buses and bridges depending on the specific implementation of the magnification system 102 and the overall design constraints. The bus interface 510 may be configured to provide an interface between the bus 508 and other circuits, such as the transceiver 512, and external devices, such as the display device 106, and the server 108.

The transceiver 512 may be configured to provide a communication of the magnification system 102 with various other apparatus, such as the display device 106, via a network. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as 5th generation mobile network, Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments.

In an aspect of the disclosure, the processor 504, the non-transitory computer-readable medium 506, or a combination of both may be configured or otherwise specially programmed to execute the operations or functionality of the hardware processor 202, the memory 204, the I/O device 206, the network interface 208, and the inference accelerator 210 or various other components described herein, as described with respect to FIGS. 1 to 5.

Various embodiments of the disclosure comprise the magnification system 102 that may be configured to magnify an image based on trained neural networks. The magnification system 102 may comprise, for example, the hardware processor 202, the memory 204, the I/O device 206, and the network interface 208, and/or the inference accelerator 210. The hardware processor 202 of the magnification system 102 may be configured to receive a first user input associated with a selection of the ROI 116 within the input image 112 of the site 114. The hardware processor 202 may be further configured to receive the second user input associated with the first magnification factor of the selected ROI 116. The first magnification factor may be associated with the magnification of the ROI 116. The hardware processor 202 of the magnification system 102 may be further configured to modify the ROI 116 based on an application of the first neural network model 104A on the ROI 116. The modification of the ROI 116 may correspond to a magnified image that may be predicted in accordance with the first magnification factor. The hardware processor 202 of the magnification system 102 may be further configured to control the display device 106 to display the modified ROI 118.

Various embodiments of the disclosure may provide a non-transitory computer-readable medium having stored thereon; computer implemented instruction that when executed by the magnification system 102 magnifies an image based on trained neural networks. The magnification system 102 may execute operations comprising receiving the first user input associated with the selection of the ROI 116 within the input image 112 of the site 114. The magnification system 102 may execute further operations comprising receiving the second user input associated with the first magnification factor of the selected ROI 116. The first magnification factor may be associated with the magnification of the ROI 116. The magnification system 102 may execute further operations comprising modifying the ROI 116 based on the application of the first neural network model 104A on the ROI 116. The ROI 116 may be magnified in accordance with the first magnification factor. The magnification system 102 may execute further operations comprising controlling the display device 106 to display the modified ROI 118.

The magnification system 102 may execute further operations comprising receiving, by the hardware processor 202, a first user input associated with a selection of a region of interest, such as the ROI 116, within the input image 112 of the site 114. The magnification system 102 may execute further operations comprising receiving a second user input associated with a first magnification factor of the selected ROI 116. The first magnification factor may be associated with a magnification of the ROI 116 in the input image 112. The magnification system 102 may execute further operations comprising modifying the ROI 116 based on an application of the first neural network model 104A on the ROI 116. The modification of the ROI 116 may correspond to a magnified image that may be predicted in accordance with the first magnification factor. The magnification system 102 may execute further operations comprising controlling a display device, such as the display device 106, to display the modified ROI 118.

In accordance with an embodiment, the first neural network model 104A may be selected from the set of neural network models 104 based on the second user input. The magnification system 102 may execute further operations comprising applying the selected first neural network model 104A on the ROI 116 for the modification of the ROI 116.

In accordance with an embodiment, the display device 106 may be controlled to render a user interface (UI) element on a display screen of the display device 106. The magnification system 102 may execute further operations comprising receiving the second user input associated with the first magnification factor via the rendered UI element.

In accordance with an embodiment, the first neural network model 104A may be trained to magnify the ROI 116 in accordance with the first magnification factor.

In accordance with an embodiment, a third user input may be received associated with a second magnification factor different from the first magnification factor. The magnification system 102 may execute further operations comprising selecting the second neural network model 104B from a set of neural network models 104 based on the third user input. The magnification system 102 may execute further operations comprising applying the selected second neural network model 104B on the ROI 116. The magnification system 102 may execute further operations comprising modifying the ROI based on the application of the second neural network model 104B on the ROI 116. The ROI 116 may be magnified in accordance with the second magnification factor.

In accordance with an embodiment, the magnification system 102 may execute further operations comprising applying the exemplary neural network model 402 on the first image 404 or the ROI in the first image 404. The magnification system 102 may execute further operations comprising generating the second image 406 based on the application of the exemplary neural network model 402 on the first image 404 or the ROI. The magnification system 102 may execute further operations comprising generating the third image 408 based on an application of a downsampling operation on the second image 406. The magnification system 102 may execute further operations comprising generating the fourth image 410 based on the application of the downsampling operation on the first image 404. The magnification system 102 may execute further operations comprising generating a fifth image 412 based on the application of the exemplary neural network model 402 on the generated fourth image 410. The magnification system 102 may execute further operations comprising training the exemplary neural network model 402 based on the first image 404, the third image 408, and the fifth image 412.

In accordance with an embodiment, the third image 408 may be generated by downsampling the second image 406 by a resizing factor associated with the first magnification factor. Further, the fourth image 410 may be generated by downsampling the first image 404 or the ROI by the resizing factor associated with the first magnification factor. In accordance with an embodiment, the resizing factor may be reciprocal of the first magnification factor.

In accordance with an embodiment, the magnification system 102 may execute further operations comprising calculating a first loss function based on a comparison of the first image 404 or the ROI with the generated third image 408. The magnification system 102 may execute further operations comprising calculating a second loss function based on the comparison of the first image 404 or the ROI with the generated fifth image 412. The exemplary neural network model 402 may be trained based on the calculated first loss function and the calculated second loss function.

In accordance with an embodiment, the magnification system 102 may execute further operations comprising determining a fractional part in a first value of the first magnification factor. The magnification system 102 may execute further operations comprising applying a nearest integer function on the first value of the first magnification factor based on a determination of the fractional part. The magnification system 102 may execute further operations comprising calculating a new value of the first magnification factor based on the application of the nearest integer function. The magnification system 102 may execute further operations comprising selecting a third neural network model from the set of neural network models 104 based on the calculated new value of the first magnification factor.

As utilized herein, the term "exemplary" means serving as a non-limiting example, instance, or illustration. As utilized herein, the terms "for example," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (for example, application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein for generating a novel molecular structure using a protein structure.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

The invention claimed is:

1. A magnification system comprising a hardware processor configured to:
   receive a first user input associated with a selection of a region of interest (ROI) within an input image of a site;
   receive a second user input associated with a first magnification factor of the selected ROI, wherein the first magnification factor is associated with a magnification of the ROI in the input image;
   modify the ROI based on an application of a first neural network model on the ROI, wherein the modification of the ROI corresponds to a magnified image that is predicted in accordance with the first magnification factor; and
   control a display device to display the modified ROI.

2. The magnification system according to claim 1, wherein the hardware processor is further configured to:
   select the first neural network model from a set of neural network models based on the second user input; and
   apply the selected first neural network model on the ROI for the modification of the ROI.

3. The magnification system according to claim 1, wherein the hardware processor is further configured to:
   control the display device to render a UI element on a display screen of the display device; and
   receive the second user input associated with the first magnification factor via the rendered UI element.

4. The magnification system according to claim 1, wherein the first neural network model is trained to magnify the ROI in accordance with the first magnification factor.

5. The magnification system according to claim 1, wherein the hardware processor is further configured to:
   receive a third user input associated with a second magnification factor different from the first magnification factor;
   select a second neural network model from a set of neural network models based on the third user input;
   apply the selected second neural network model on the ROI; and
   modify the ROI based on the application of the second neural network model on the ROI, wherein the ROI is magnified in accordance with the second magnification factor.

6. The magnification system according to claim 1, wherein the hardware processor is further configured to:
   apply an exemplary neural network model on a first image or an ROI in the first image;
   generate a second image based on the application of the exemplary neural network model on the first image or the ROI;
   generate a third image based on an application of a downsampling operation on the second image;
   generate a fourth image based on the application of the downsampling operation on the first image;
   generate a fifth image based on the application of the exemplary neural network model on the generated fourth image; and
   train the exemplary neural network model based on the first image, the third image, and the fifth image.

7. The magnification system according to claim 6, wherein the hardware processor is further configured to:
   calculate a first loss function based on a comparison of the first image or the ROI with the generated third image; and
   calculate a second loss function based on the comparison of the first image or the ROI with the generated fifth image, wherein the exemplary neural network model is trained based on the calculated first loss function and the calculated second loss function.

8. The magnification system according to claim 6, wherein the third image is generated by downsampling the second image by a resizing factor associated with the first magnification factor, and the fourth image is generated by downsampling the first image or the ROI by the resizing factor associated with the first magnification factor.

9. The magnification system according to claim 8, wherein the resizing factor is reciprocal of the first magnification factor.

10. The magnification system according to claim 1, wherein the hardware processor is further configured to:
determine a fractional part in a first value of the first magnification factor;
apply a nearest integer function on the first value of the first magnification factor based on a determination of the fractional part;
calculate a new value of the first magnification factor based on the application of the nearest integer function; and
select a third neural network model from a set of neural network models based on the calculated new value of the first magnification factor.

11. A computer implemented method comprising:
receiving, by a hardware processor, a first user input associated with a selection of a region of interest (ROI) within an input image of a site;
receiving, by the hardware processor, a second user input associated with a first magnification factor of the selected ROI, wherein the first magnification factor is associated with a magnification of the ROI in the input image;
modifying, by the hardware processor, the ROI based on an application of a first neural network model on the ROI, wherein the ROI is magnified in accordance with the first magnification factor; and
controlling, by the hardware processor, a display device to display the modified ROI.

12. The method according to claim 11, further comprising:
selecting, by the hardware processor, the first neural network model from a set of neural network models based on the second user input; and
applying, by the hardware processor, the selected first neural network model on the ROI for the modification of the ROI.

13. The method according to claim 11, further comprising:
controlling, by the hardware processor, the display device to render a UI element on a display screen of the display device; and
receiving, by the hardware processor, the second user input associated with the first magnification factor via the rendered UI element.

14. The method according to claim 11, wherein the first neural network model is trained to magnify the ROI in accordance with the first magnification factor.

15. The method according to claim 11, further comprising:
receiving, by the hardware processor, a third user input associated with a second magnification factor different from the first magnification factor;
selecting, by the hardware processor, a second neural network model from a set of neural network models based on the third user input;
applying, by the hardware processor, the selected second neural network model on the ROI; and
modifying, by the hardware processor, the ROI based on the application of the second neural network model on the ROI, wherein the ROI is magnified in accordance with the second magnification factor.

16. The method according to claim 11, further comprising:
applying, by the hardware processor, an exemplary neural network model on a first image or the ROI;
generating, by the hardware processor, a second image based on the application of the first neural network model on the first image or the ROI;
generating, by the hardware processor, a third image based on an application of a downsampling operation on the second image;
generating, by the hardware processor, a fourth image based on the application of the downsampling operation on the first image;
generating, by the hardware processor, a fifth image based on the application of the exemplary neural network model on the generated fourth image; and
training, by the hardware processor, the exemplary neural network model based on the first image, the third image, and the fifth image.

17. The method according to claim 16, further comprising:
calculating, by the hardware processor, a first loss function based on a comparison of the first image or the ROI with the generated third image; and
calculating, by the hardware processor, a second loss function based on the comparison of the first image or the ROI with the generated fifth image,
wherein the exemplary neural network model is trained based on the calculated first loss function and the calculated second loss function.

18. The method according to claim 16, wherein the third image is generated by downsampling the second image by a resizing factor associated with the first magnification factor, and the fourth image is generated by downsampling the first image or the ROI by the resizing factor associated with the first magnification factor.

19. The method according to claim 18, wherein the resizing factor is reciprocal of the first magnification factor.

20. A computer program product comprising a non-transitory computer-readable medium including computer program instructions, which when executed by a hardware processor are configured to:
receiving, in a magnification system, a first user input associated with a selection of a region of interest (ROI) within an input image of a site;
receiving, in the magnification system, a second user input associated with a first magnification factor of the selected ROI, wherein the first magnification factor is associated with a magnification of the ROI in the input image;
modifying the ROI based on an application of a first neural network model on the ROI, wherein the modification of the ROI corresponds to a magnified image that is predicted in accordance with the first magnification factor; and
controlling a display device to display the modified ROI.

* * * * *